US009354944B2

(12) United States Patent
Gaster et al.

(10) Patent No.: US 9,354,944 B2
(45) Date of Patent: May 31, 2016

(54) MAPPING PROCESSING LOGIC HAVING DATA-PARALLEL THREADS ACROSS PROCESSORS (75) Inventors: Benedict Gaster, Mountain View, CA (US); Jayanth Gummaraju, San Francisco, CA (US); Laurent Morichetti, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1095 days.

(21) Appl. No.: 12/509,763

(22) Filed: Jul. 27, 2009

(65) Prior Publication Data
US 2011/0022817 A1 Jan. 27, 2011

(51) Int. Cl.
*G06F 9/52* (2006.01)
*G06F 9/50* (2006.01)

(52) U.S. Cl.
CPC .............. *G06F 9/52* (2013.01); *G06F 9/5044* (2013.01)

(58) Field of Classification Search
None
See application file for complete search history.

(56) References Cited

U.S. PATENT DOCUMENTS

| 6,729,699 | B1 * | 5/2004 | Prabhu | 719/310 |
|---|---|---|---|---|
| 7,623,134 | B1 * | 11/2009 | Danilak | G06F 12/08 345/537 |
| 7,685,599 | B2 | 3/2010 | Kanai et al. | |
| 7,743,232 | B2 | 6/2010 | Shen et al. | |
| 7,788,468 | B1 * | 8/2010 | Nickolls et al. | 712/22 |
| 7,861,060 | B1 * | 12/2010 | Nickolls et al. | 712/22 |
| 7,925,860 | B1 * | 4/2011 | Juffa et al. | 712/10 |
| 8,074,224 | B1 * | 12/2011 | Nordquist et al. | 718/104 |
| 8,225,325 | B2 * | 7/2012 | Munshi et al. | 718/104 |
| 8,286,198 | B2 * | 10/2012 | Munshi et al. | 719/328 |
| 8,370,845 | B1 * | 2/2013 | Le Grand | 718/106 |
| 8,479,217 | B2 | 7/2013 | Chinya et al. | |
| 8,607,234 | B2 * | 12/2013 | Memik et al. | 718/101 |
| 8,860,741 | B1 * | 10/2014 | Juffa | G09G 5/36 345/530 |
| 2004/0068725 | A1 * | 4/2004 | Mathiske et al. | 718/1 |
| 2004/0231000 | A1 * | 11/2004 | Gossalia | G06T 1/60 725/132 |

(Continued)

FOREIGN PATENT DOCUMENTS

| JP | 2005100264 A | 4/2005 |
|---|---|---|
| JP | 2007102781 A | 4/2007 |

(Continued)

OTHER PUBLICATIONS

Stratton et al, "MCUDA: an Efficient Implementation of CUDA Kernels for Multi-Core CPUs", Springer-Verlag, Berlin, 2008, pp. 16-30.*

(Continued)

*Primary Examiner* — Abdullah Al Kawsar
(74) *Attorney, Agent, or Firm* — Volpe and Koenig, P.C.

(57) ABSTRACT

A method for executing a plurality of data-parallel threads of a processing logic on a processor core includes grouping the plurality of data-parallel threads into one or more workgroups, associating a first workgroup from the one or more workgroups with an operating system thread on the processor core, and configuring threads from the first workgroup as user-level threads within the operating system thread. In an example, a method enables the execution of GPU-kernels that has been previously configured for a GPU, to execute on a CPU such as a multi-core CPU. The mapping of the numerous data-parallel threads to the CPU is done in such a manner as to reduce the number of costly operating system threads instantiated on the CPU, and to enable efficient debugging.

25 Claims, 6 Drawing Sheets

(56) References Cited

U.S. PATENT DOCUMENTS

| | | | |
|---|---|---|---|
| 2005/0198464 A1* | 9/2005 | Sokolov | 711/203 |
| 2006/0095718 A1* | 5/2006 | Day | G06F 9/544 712/34 |
| 2006/0212868 A1* | 9/2006 | Takayama et al. | 718/100 |
| 2008/0034179 A1* | 2/2008 | Mewhinney et al. | 711/163 |
| 2008/0143730 A1* | 6/2008 | Lindholm et al. | 345/501 |
| 2008/0276220 A1* | 11/2008 | Munshi et al. | 717/119 |
| 2008/0276262 A1 | 11/2008 | Munshi et al. | |
| 2009/0128574 A1 | 5/2009 | Fujii et al. | |
| 2009/0141034 A1 | 6/2009 | Pryor et al. | |
| 2009/0284537 A1* | 11/2009 | Hong et al. | 345/522 |
| 2009/0307699 A1* | 12/2009 | Munshi et al. | 718/102 |
| 2009/0307704 A1* | 12/2009 | Munshi et al. | 718/104 |
| 2010/0135418 A1* | 6/2010 | Zhang et al. | 375/240.25 |
| 2010/0156888 A1* | 6/2010 | Luk et al. | 345/418 |
| 2011/0035737 A1* | 2/2011 | Stefansson et al. | 717/149 |
| 2011/0067016 A1* | 3/2011 | Mizrachi et al. | 717/149 |

FOREIGN PATENT DOCUMENTS

| | | |
|---|---|---|
| JP | 2007316940 A | 12/2007 |
| JP | 2009059181 A | 3/2009 |
| TW | 200912738 A | 3/2009 |
| WO | WO 2008/127610 A2 | 10/2008 |

OTHER PUBLICATIONS

Nickolls et al, "Scalable Parallel Programming", ACM Queue, Mar.-Apr. 2008, pp. 40-53.*

John A. Stratton, Sam S. Stone, and Wen-mei W. Hwu; MCUDA: An Efficient Implementation of CUDA Kernels on Multi-cores; IMPACT Technical Report 2008; 19 pages.*

Combined International Search Report and Written Opinion, International Appln. No. PCT/US2010/043078, International Filing Date, Jul. 23, 2010, mailed Nov. 5, 2010, 11 pages.

"Multithreaded Programming Guide", Dec. 31, 2001; XP55207852, retrieved from the Internet: docs.oracle.com/cd/E19455-01/806-5257/book-info/index.html.

"Understanding Basic Multithreading Concepts", Dec. 31, 2001; XP55207853, retrieved from the Internet: docs.oracle.com/cd/E19455-01/806-5257/6je9h032e/index.html#mtintro-69945.

* cited by examiner

MAPPING PROCESSING LOGIC HAVING DATA-PARALLEL THREADS ACROSS PROCESSORS

BACKGROUND OF THE INVENTION

1. Field of the Invention

The present invention relates generally to computer processors and data-parallel threads.

2. Background Art

Computers and other such data processing devices have at least one control processor that is generally known as a control processing unit (CPU). Such computers and processing devices can also have other processors such as graphics processing units (GPU) that are used for specialized processing of various types. For example, GPUs are designed to be particularly suited for graphics processing operations. GPUs generally comprise multiple processing elements that are ideally suited for executing the same instruction on parallel data streams, such as in data-parallel processing. In general, a CPU functions as the host or controlling processor and hands-off specialized functions such as graphics processing to other processors such as GPUs.

With the availability of multi-core CPUs where each CPU has multiple processing cores, substantial processing capabilities that can also be used for specialized functions are available in CPUs. One or more of the computation cores of multi-core CPUs or GPUs can be part of the same die (e.g., AMD Fusion™) or in different dies (e.g., Intel Xeon™ with NVIDIA GPU). Recently, hybrid cores having characteristics of both CPU and GPU (e.g., CellSPE™, Intel Larrabee™) have been generally proposed for General Purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets. Many of the multi-core CPU cores have performance that is comparable to GPUs in many areas. For example, the floating point operations per second (FLOPS) of many CPU cores are now comparable to that of some GPU cores.

Several frameworks have been developed for heterogeneous computing platforms that have CPUs and GPUs. These frameworks include BrookGPU by Stanford University, CUDA by NVIDIA, and OpenCL by an industry consortium named Khronos Group. The OpenCL framework offers a C-like development environment using which users can create applications for GPU. OpenCL enables the user, for example, to specify instructions for offloading some computations, such as data-parallel computations, to a GPU. OpenCL also provides a compiler and a runtime environment in which code can be compiled and executed within a heterogeneous computing system.

What are needed, therefore, are methods and systems that enable the efficient use of CPU capabilities for the execution of functions that are generally processed on a GPU.

BRIEF SUMMARY OF THE INVENTION

Systems and methods for executing a plurality of data-parallel threads of a processing logic on a processor core are disclosed. The method for executing a plurality of data-parallel threads of a processing logic on a processor core includes grouping the plurality of data-parallel threads into one or more workgroups, associating a first workgroup from the one or more workgroups with an operating system thread on the processor core, and configuring threads from the first workgroup as user-level threads within the operating system thread. The processing logic can include GPU-kernels that are previously configured for execution on a GPU. The processor cores can include CPU cores, such as, the processing cores of a multi-core CPU.

Another embodiment is a method for executing a GPU-kernel that includes loading the GPU-kernel to a host processor, forming one or more workgroups where each workgroup includes data-parallel threads, and associating the workgroups with operating system threads of one or more processor cores coupled to the host processor. Each workgroup can be associated with one or more operating system threads, and each operating system thread is configured to execute only on one processor core. The method can also include the step of configuring data-parallel threads of each workgroup as user-level threads within each respective associated operating system thread.

Another embodiment is a system for executing a plurality of data-parallel threads of a processing logic on a processor core. The system includes at least one processor including the processor core, at least one memory coupled to the processor core, and a GPU-kernel scheduler. The GPU-kernel scheduler is configured for grouping the plurality of data-parallel threads into one or more workgroups, associating a first workgroup from the one or more workgroups with an operating system thread on the processor core, and executing threads from the first workgroup as user-level threads within the operating system thread.

Yet another embodiment is a computer program product comprising a computer readable medium having computer program logic recorded thereon for causing at least one processor to group a plurality of data-parallel threads into one or more workgroups, associating a first workgroup from the one or more workgroups with an operating system thread on the processor core, and executing threads from the first workgroup as user-level threads within the operating system thread.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

Embodiment of the present invention may yield substantial advantages by enabling the use of the same or similar code base on CPU and GPU processors and also by facilitating the debugging of such code bases. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors. The present invention is particularly useful where the system comprises a heterogeneous computing system. A "heterogeneous computing system," as the term is used herein, is a computing system in which multiple kinds of processors are available.

Embodiments of the present invention enable the same code base to be executed on different processors, such as GPUs and CPUs. Embodiments of the present invention, for example, can be particularly advantageous in processing systems having multi-core CPUs, and/or GPUs, because code developed for one type of processor can be deployed on another type of processor with little or no additional effort. For example, code developed for execution on a GPU, also known as GPU-kernels, can be deployed to be executed on a CPU, using embodiments of the present invention.

Also, the present invention enables the deployment of GPU-kernels that typically involve numerous data-parallel threads, on CPUs and other processors in a manner that helps in debugging the threads.

A Heterogeneous Computing System

Figure 1:
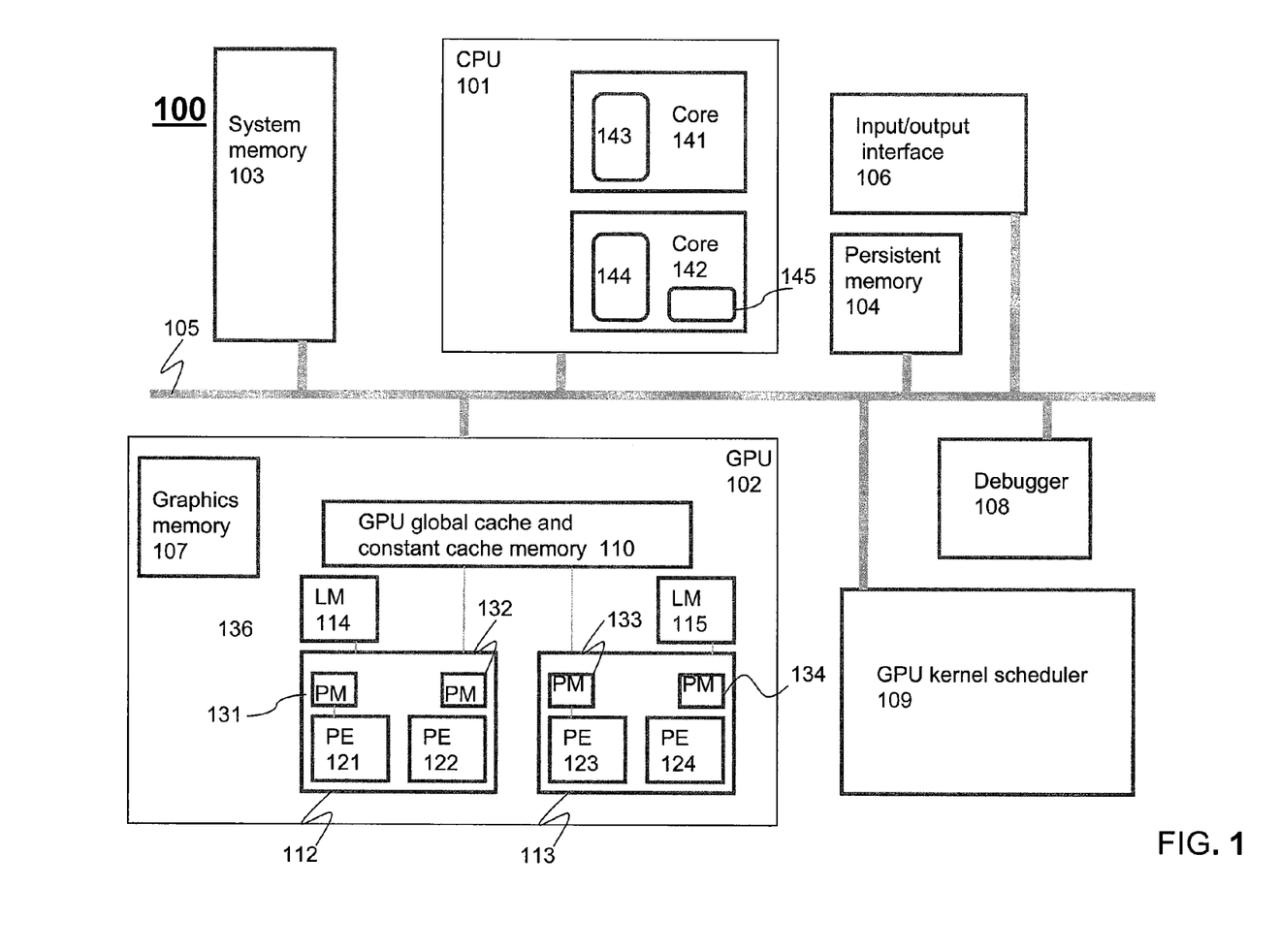
FIG. 1 shows a heterogeneous computing system, according to an embodiment of the present invention.

An example heterogeneous computing system 100, according to an embodiment of the present invention, is shown in FIG. 1. Heterogeneous computing system 100 can include one or more CPUs, such as CPU 101, and one or more GPUs, such as GPU 102. Heterogeneous computing system 100 can also include at least one system memory 103, at least one persistent storage device 104, at least one system bus 105, at least one input/output device 106, a GPU-kernel scheduler 109, and debugger 108.

CPU 101 can include any commercially available control processor or a custom control processor. CPU 101, for example, executes the control logic that controls the operation of heterogeneous computing system 100. CPU 101 can be a multi-core CPU, such as a multi-core CPU with two CPU cores 141 and 142. CPU 101, in addition to any control circuitry, can include CPU cache memory such as the cache memories 143 and 144 of CPU cores 141 and 142, respectively. CPU cache memories 143 and 144 can be used to temporarily hold instructions and/or parameter values during the execution of an application on CPU cores 141 and 142, respectively. For example, CPU cache memory 143 can be used to temporarily hold one or more control logic instructions, values of variables, or values of constant parameters, from the system memory 103 during the execution of control logic instructions on CPU core 141. In some embodiments, CPU 101 can also include specialized vector instruction processing units. For example, CPU core 142 can include a Streaming SIMD Extensions (SSE) unit that can efficiently process vectored instructions. A person skilled in the art will understand that CPU 101 can include more or less than the CPU cores in the example chosen, and can also have either no cache memories, or more complex cache memory hierarchies.

GPU 102 can include any commercially available graphics processor or custom designed graphics processor. GPU 102, for example, can execute specialized code for selected functions. In general, GPU 102 can be used to execute graphics functions such as graphics pipeline computations such as geometric computations and rendering of image on a display.

GPU 102 can include a GPU global cache memory 110 and one or more compute units 112 and 113. A graphics memory 107 can be included in or coupled to GPU 102. Each compute unit 112 and 113 are associated with a GPU local memory 114 and 115, respectively. Each compute unit includes one or more GPU processing elements (PE). For example, compute unit 112 includes GPU processing elements 121 and 122, and compute unit 113 includes GPU processing elements 123 and 124. Each GPU processing element 121, 122, 123, and 124, is associated with at least one private memory (PM) 131, 132, 133, and 134, respectively. Each GPU processing element can include one or more of a scalar and vector floating-point units. The GPU processing elements can also include special purpose units such as inverse-square root units and sine/cosine units. GPU global cache memory 110 can be coupled to a system memory such as system memory 103, and/or graphics memory such as graphics memory 107.

System memory 103 can include at least one non-persistent memory such as dynamic random access memory (DRAM). System memory 103 can hold processing logic instructions, constant values and variable values during execution of portions of applications or other processing logic. For example, in one embodiment, the control logic and/or other processing logic of GPU-kernel scheduler 109 can reside within system memory 103 during execution of GPU-kernel scheduler 109 by CPU 101. The term "processing logic," as used herein, refers to control flow instructions, instructions for performing computations, and instructions for associated access to resources.

Persistent memory 104 includes one or more storage devices capable of storing digital data such as magnetic disk, optical disk, or flash memory. Persistent memory 104 can, for example, store at least parts of instruction logic of GPU-kernel scheduler 109 and debugger 108. For example, at the startup of heterogeneous computing system 100, the operating system and other application software can be loaded in to system memory 103 from persistent storage 104.

System bus 105 can include a Peripheral Component Interconnect (PCI) bus, Advanced Microcontroller Bus Architecture (AMBA) bus, Industry Standard Architecture (ISA) bus, or such a device. System bus 105 can also include a network such as a local area network (LAN). System bus 105 includes the functionality to couple components including components of heterogeneous computing system 100.

Input/output interface 106 includes one or more interfaces connecting user input/output devices such as keyboard, mouse, display and/or touch screen. For example, user input can be provided through a keyboard and mouse connected user interface 106 to heterogeneous computing system 100. The output of heterogeneous computing system 100, such as the output GPU-kernel scheduler 109 and debugger 108, can be output to a display through user interface 106.

Graphics memory 107 is coupled to system bus 105 and to GPU 102. Graphics memory 107 is, in general, used to hold data transferred from system memory 103 for fast access by the GPU. For example, the interface between GPU 102 and graphics memory 107 can be several times faster than the system bus interface 105.

Debugger 108 includes functionality to debug application code and other processing logic executing on heterogeneous computing system 100. For example, debugger 108 can include functionality to monitor one or more variables during the execution of application code and/or other processing logic. In heterogeneous computing environments, debugger 108 may require the ability to monitor the execution of application code and other processing logic on the CPUs as well as GPUs.

GPU-kernel scheduler 109 includes functionality to schedule functions and processing logic written specifically for execution on a GPU, on either a GPU or on a CPU. GPU-kernel scheduler is further described in relation to FIG. 2 below. A person of skill in the art will understand that debugger 108 and GPU-kernel scheduler 109 can be implemented using software, firmware, hardware, or any combination thereof. When implemented in software, for example, GPU-kernel scheduler 109 can be a computer program written in C or OpenCL, that when compiled and executing resides in system memory 103. In source code form and/or compiled executable form, GPU-kernel scheduler 109 can be stored in persistent memory 104. In one embodiment, some or all of the functionality of GPU-kernel scheduler 109 and/or debugger 108 is specified in a hardware description language such as Verilog, RTL, netlists, to enable ultimately configuring a manufacturing process through the generation of maskworks/photomasks to generate a hardware device embodying aspects of the invention described herein.

A person of skill in the art will understand that heterogeneous computing system 100 can include more or less components that shown in FIG. 1. For example, heterogeneous computing system 100 can include one or more network interfaces, and or software applications such as the OpenCL framework.

GPU-kernels

A "GPU-kernel", as the term is used herein, comprises code and/or processing logic that executes one or more functions or operations on a GPU. For example, GPU-kernels are developed for matrix multiplication, matrix transpose, subdivision, equation solving, and numerous other operations. In the GPGPU model, for example, GPU-kernels are code fragments of functions and/or other operations that can be off-loaded by a CPU to be executed on a GPU. In a typical GPGPU application, the same GPU-kernel code will execute simultaneously on multiple parallel data streams. This is known as "data-parallel" computing. For example, in multiplying two matrices, multiple pairs of corresponding elements from the two source matrices can be simultaneously multiplied using different processing cores. Although a simple example, matrix multiplication can illustrate the data-parallel operations on a GPU.

Following the above matrix multiplication example, the computation for each element of the resulting matrix can be considered as a separate thread of execution (thread). Threads corresponding to each element of the resulting matrix can execute in parallel. In GPU 102, for example, threads may simultaneously execute on each processing element 121, 122, 123, and 124.

If multiple pairs of matrixes are to be multiplied, for example, as is common in graphics applications, then each pair of matrices can be assigned to a compute element, such as compute elements 112 and 113.

The execution of GPU-kernels can be described with respect to GPU 102. A GPU-kernel generally executes as multiple threads in parallel. Each of these parallel threads is a "workitem." Each workitem can execute on a processing element, such as, processing elements 121, 122, 123, or 124. The workitems assigned to a compute unit are known as a "workgroup."

In general, synchronization among workitems is limited to those within a single workgroup. This restriction is generally enforced in environments with large numbers of threads, so that the number of threads can be efficiently managed. However, in some embodiments synchronization may not be limited to workitems in a single workgroup.

GPU-kernel Scheduler

Figure 2:
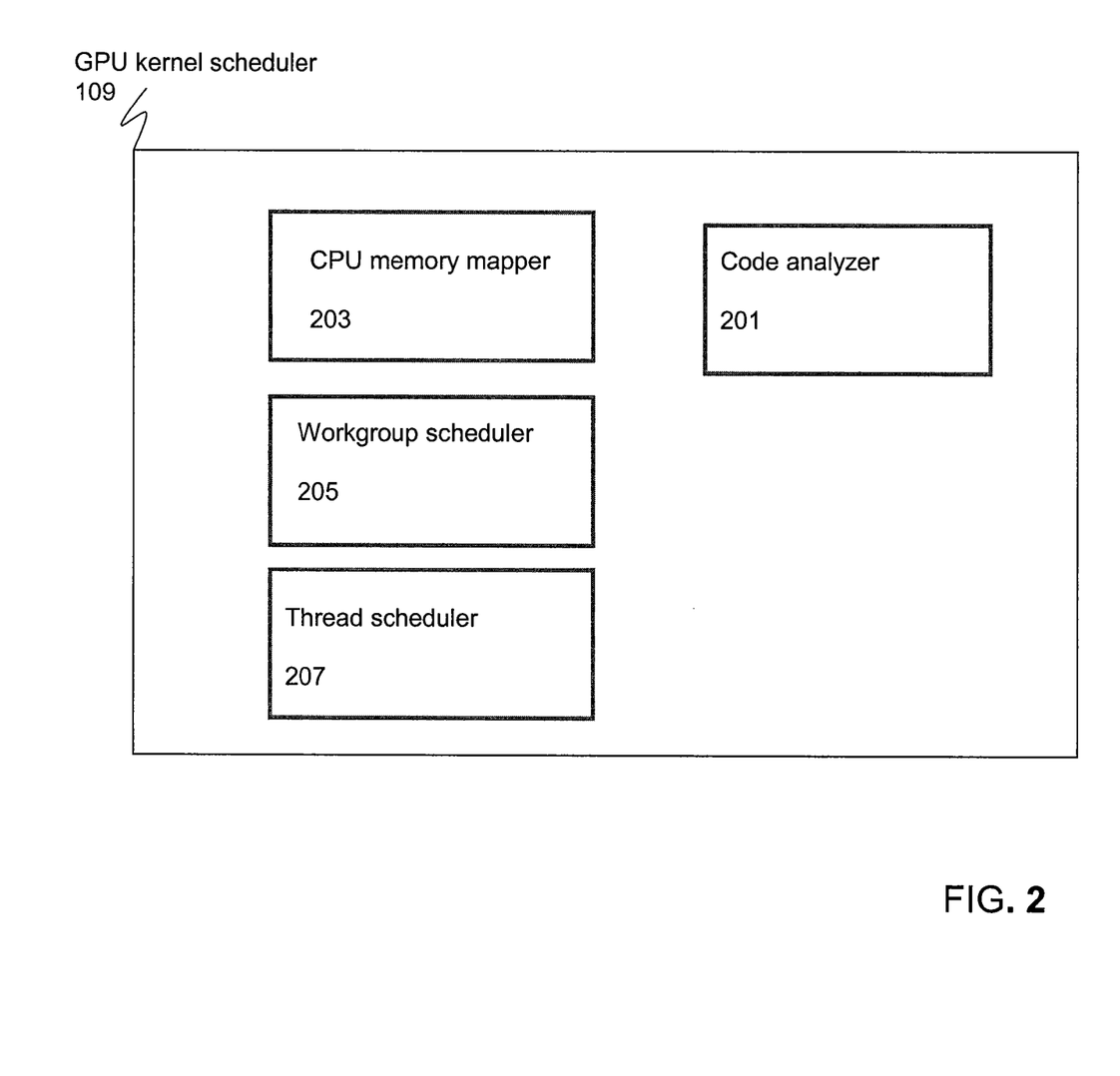
FIG. 2 shows a GPU-kernel scheduler, according to an embodiment of the present invention.

FIG. 2 illustrates components of GPU-kernel scheduler 109, according to an embodiment of the present invention. GPU-kernel scheduler 109 can comprise a code analyzer 201, a CPU memory mapper 203, a workgroup scheduler 205, and a thread scheduler 207. Persons of skill in the art will appreciate that GPU-kernel scheduler 109 can comprise additional components and/or different combinations of components 201-207.

Code analyzer 201 includes functionality to analyze code, such as OpenCL code. Code analyzer 201 can identify code fragments and/or GPU-kernels in the code being analyzed that can be advantageously scheduled a CPU or alternatively on a GPU. Code analyzer 201 can also include the functionality to know the particulars of the target platform. For example, code analyzer 201 can identify the number of CPU cores, and GPU cores available on the target platform. It may also identify the amount of system memory, cache memory, global GPU cache memory, and the like.

CPU memory mapper 203 includes functionality to determine the memory availability of the CPUs to which code can be dispatched for execution, and to prepare the CPU memory for executing mapped GPU-kernels.

Workgroup scheduler 205 includes functionality to schedule a workgroup. For example, workgroup scheduler 205 can determine the appropriate set of compute units of a GPU that can be used for executing each workgroup. In another embodiment, workgroup scheduler can also determine how the workitem threads of a GPU-kernel should be grouped to workgroups so that the workgroups can be assigned to threads on one or more CPU cores. Workgroup scheduler can also include functionality to map a workgroup of GPU-kernel threads to a CPU or CPU core.

Thread scheduler 207 includes functionality to schedule threads of a GPU-kernel on a GPU or CPU. For example, thread scheduler 207 can determine the assignment of threads to processing elements 121, 122, 123, or 124 in a manner that processing requirements of the threads can be accommodated. In one embodiment, thread scheduler 207 determines at which processing element in GPU 102 each workitem can be scheduled. In another embodiment, thread scheduler 207 schedules workitem threads on CPU 101. For example, thread scheduler 207 can schedule workitem threads of one workgroup on a single CPU core, such as CPU core 142. The functionality of modules 201-207 are further described in relation to FIGS. 3-6 below, according to an embodiment of the present invention.

Mapping and Executing GPU-kernels on CPU Cores

Figure 3:
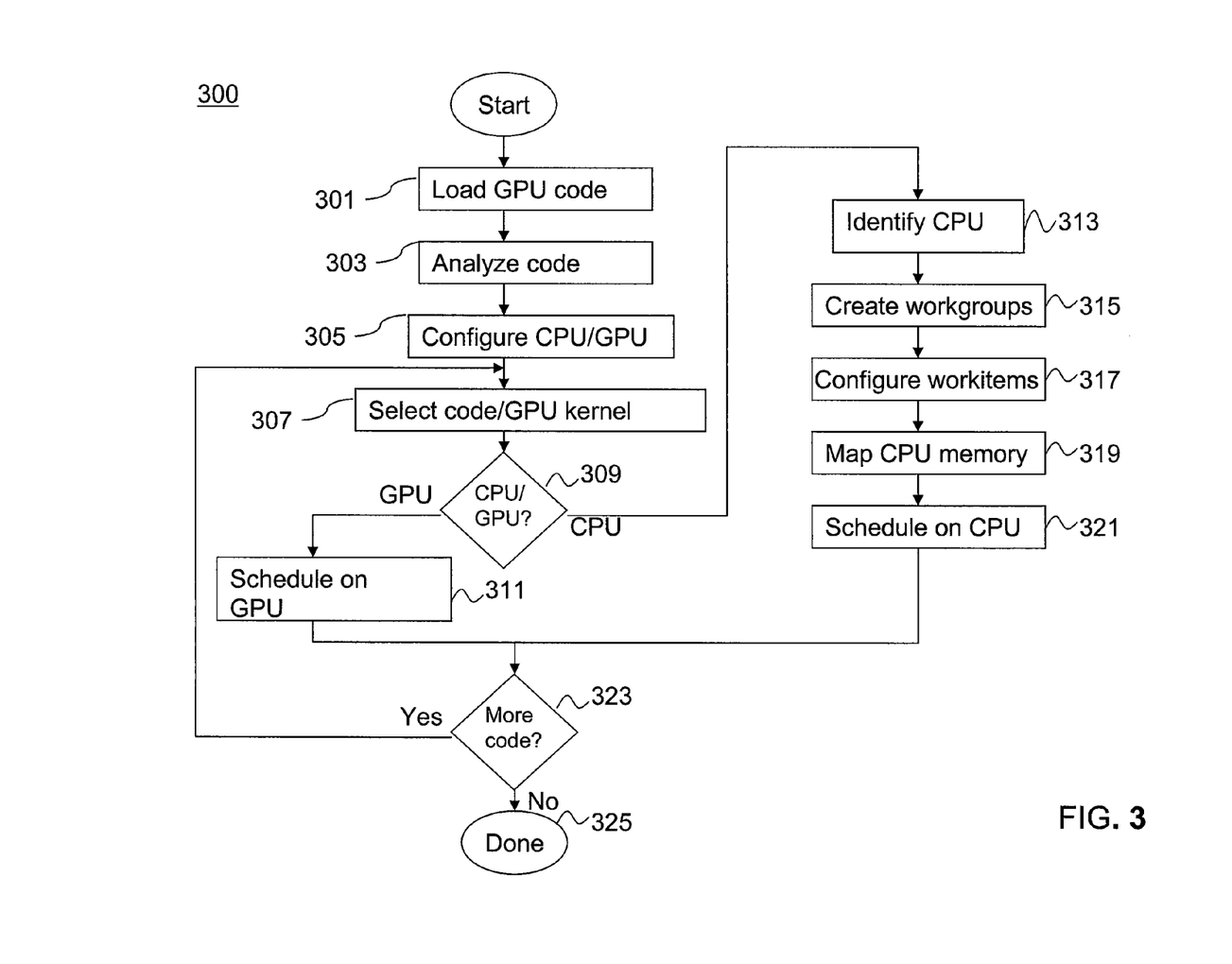
FIG. 3 is a process for executing code on a heterogeneous computing system, according to an embodiment of the present invention.

FIG. 3 shows a process 300 for executing code on a heterogeneous computing system, according to an embodiment of the present invention. Process 300 can execute, for example, on heterogeneous computing system 100. In one embodiment, process 300 can represent the flow of processing logic of GPU-kernel scheduler 109.

Without loss of generality, the following description is primarily based on the OpenCL framework. Persons skilled in the art will recognize that embodiments of the present invention can also be implemented using other development and execution frameworks such as, but not limited to, the CUDA framework, BrookGPU framework, and the like. As described above, OpenCL provides a development environment, compiler and a runtime environment in which code can be developed, compiled and executed within a heterogeneous computing system.

OpenCL also provides built-in library functions and application programming interfaces (API) that can be called by the user applications to execute various functions, such as, deploying a GPU-kernel to be executed on a selected processor. In general, OpenCL framework primarily executes on a host system and controls the operation of coupled processors by deploying commands (e.g., executable code including GPU-kernels) to each processor. For example, OpenCL may primarily execute on CPU core 141, and control the operation of GPU 102, and CPU cores 141 and 142 by deploying commands to be executed on the respective devices.

In step 301, the code for one or more applications is loaded. The loaded code may be source code or other form of pre-compilation code such as byte-code. In some embodiments, the code can also include embedded compiled functions. For example, some functions can be dynamically linked from a library based on embedded function calls in the application. For purposes of description, it will be assumed that the loaded code is in source code form, in a programming language such as OpenCL. The source code can initially reside, for example, on persistent storage device 104. In loading the code in step 301, the source code can be loaded into memory, for example, system memory 103. It should be noted, that the loaded code can include a combination of source code, pre-compilation code, and/or compiled binaries. For example, the OpenCL development, compilation, and execution framework, within which process 300 may be implemented, allows the loading of source code and/or compiled binaries of GPU-kernels. An OpenCL program, for example, can include GPU-kernels, control flow code, and other functions called by GPU-kernels.

In step 303, the loaded code is analyzed. Analysis of the code can include parsing the code. In some embodiments, the code analyzed in step 303 can include valid OpenCL code or code in another programming language or framework such as C. In the analysis step 303, the required CPU resources can be determined. For example, the analysis and/or parsing can determine the total number of threads (workitems) that are required to be scheduled on the one or more CPU cores. Also, the analysis step 303 can be used to determine memory requirements, such as the actual amounts of private memory and local memory used by the GPU-kernel. In one embodiment, steps 301 and 303 can be implemented using the processing logic of code analyzer 201.

In step 305, the heterogeneous computing system is configured to run the code loaded in step 301. For example, based on the code analysis performed in step 303, a number of the CPUs and GPUs can be allocated to run the loaded code. Step 305 can also include configuring memory resources, such as, memory 103, to prepare for the execution of the loaded code.

Steps 307-323 are repeated for each function and/or GPU-kernel in the loaded code. For example, the loaded source code can be scanned in a top-to-bottom manner identifying each function and/or GPU-kernel. In step 307, a function and/or GPU-kernel is identified. In one embodiment, for example, GPU-kernels may be identified by a predetermined identifier such as the _kernel identifier in OpenCL.

In step 309, it is determined whether to execute the code segment identified in step 307, on a CPU or a GPU. For example, the default behavior may be to execute all functions other than GPU-kernels on a CPU and to execute all GPU-kernels on a GPU. Another consideration can be to determine if a command or function is data-parallel, for example, based on identifiers embedded in the code. Data-parallel commands or functions can be preferably scheduled to a GPU. Other criteria may also be used, such as load balancing requirements and application characteristics.

If it is determined (in step 309) that the processing logic and/or code segment is to be executed on a GPU, it is scheduled to be implemented on a GPU in step 311. In some embodiments, the processing logic and/or code segments are scheduled to be implemented on a specific GPU.

In step 311, the processing logic and/or code segment is scheduled on a selected GPU. Step 311 may include determining the structure of the GPU, e.g., the number of compute devices in the GPU, and the number of processing elements within each compute device. Step 311 can also include creating a context and a command queue for that GPU, creating memory objects associated with the context, compiling and creating GPU-kernel objects, issuing corresponding commands to the command queue to execute the GPU-kernel objects, and performing any synchronization of the issued commands.

Determining the structure of the GPU can involve, for example, using an OpenCL API call to query for compute devices (e.g., CPUs, GPUs) available in the system, and then to query one or more of the identified compute devices for its local information. From a list of compute devices, a GPU device can be queried to determine the number of GPU processing elements, range limits, workgroup size, sizes of different memory spaces, maximum memory object sizes, and the like.

In scheduling a processing logic and/or code segment to be executed on a selected GPU, a command including an executable code including the code segment (e.g., executable kernel object) can be scheduled to a command queue created in the context of the selected GPU. A "context," as used herein, defines the execution environment for the GPU-kernel. The context can include handles and other information for devices, memory, and other program objects associated with the kernel. For example, the context can provide the executing kernel with the GPU device and memory locations it is permitted to use.

Memory objects created can correspond to source and destination objects. For example, if the processing logic and/or code segment performs an iterative array addition, then the source objects can be the two source arrays. The destination object can be the array in which the output result is written. Memory objects can be created in the system memory 103 or in the graphics memory 107. Memory objects may subsequently be cached in various caches such as caches 110, 143, and 144. Each memory object created is associated with a corresponding context.

Creation of the executable kernel objects is done by compiling the processing logic and/or code segment, and linking any required device specific modules. For example, the compiled kernel object can include the kernel function code or instructions, any arguments provided to the kernel, the associated context, and library code related to the GPU on which it is to be executed.

After the kernel objects are created, the command to execute the kernel is queued to a command queue. The manner in which the command is enqueued may be specific to whether the command is a data-parallel or task-parallel command. For example, in the iterative array addition example, a data-parallel command can enqueue a single command with instructions to parallelly execute in a specified number of compute devices, whereas a task-parallel model can result in a number of separate commands being enqueued, one command for each array element.

In step 309, if the determination is made that the processing logic and/or code segment should be executed on a CPU, process 300 proceeds to step 313. In step 313, one or more CPUs can be selected to execute the code segment. In some embodiments, for example, in multi-core CPU systems, the selection of the CPU can be based on the load or processing capability of the CPU. Other consideration, such as the availability and magnitude of available cache memory, and the like, can also be considered.

For ease of description the description of steps 311-321 assumes that the processing logic and/or code segment to be executed on the CPU is a GPU-kernel. Mapping the GPU-kernel to the selected CPU can include mapping of the fine-grained GPU threads (i.e., workitems) to the CPU core and also mapping of the GPU memory hierarchy to the CPU memory system. In step 315, the GPU-kernel threads are mapped to the selected CPU. If the GPU-kernel is naively mapped to the CPU, each GPU workitem would map to an operating system (OS) thread. The processing of step 315 can be part of the functionality provided by workgroup scheduler 205.

CPUs have a much more restricted number of hardware contexts, and often have only one hardware context. The OS is generally responsible for scheduling and executing OS threads. The naive mapping of workitems to OS threads can result in hundreds if not thousands of threads. Having numerous threads execute in a single context can result in substantial inefficiencies for reasons including numerous context-switches required when each process executes. Also, having the OS manage a large number of threads can be very inefficient. Embodiments of the present invention, accomplish the mapping from GPU to CPU in such a way as to achieve high performance and also to facilitate debugging of applications having numerous threads.

Mapping the workitems of a GPU-kernel to the CPU core, in embodiments of the present invention, is done in such a manner as to take advantage of multi-core CPUs where available and to have a manageable number of OS threads to avoid inefficiencies related to context switching and the like. Therefore, in embodiments of the present invention, instead of workitems, a workgroup is the unit that is mapped and/or associated with an OS thread. One or more workitems are grouped to a workgroup. The number of workitems in a workgroup can be predetermined or can be determined based on criteria such as the number and capacity of available processing cores. Mapping and/or associating a workgroup with an OS thread can include configuration for either spawning a new OS thread for the workgroup, or attaching the workgroup to an already existing OS thread. API functions for spawning new OS threads and for attaching to an existing thread are provided by one or more of the OpenCL framework (including the OpenCL runtime system) and the underlying operating system.

Each workgroup of the GPU-kernel can be mapped to a CPU core, for example, by setting a processor affinity for the OS thread associated with the workgroup. Each CPU core can be assigned one or more workgroups. Multiple workgroups per CPU core can be executed in parallel. In an embodiment, each CPU core is configured to execute only a single workgroup at a time. For example, only a single OS thread is created in each CPU core. Each CPU core can execute multiple workgroups by executing one workgroup to a finish, and then executing another.

In step 317, threads within a workgroup are mapped and/or configured. The processing of step 317 can be part of the functionality provided by thread scheduler 207. Within each OS thread that is mapped to a workgroup, the workitem threads are configured to execute in sequence, one after another. The workitem threads are implemented as user-level threads. Implementing the workitem threads as user-level threads avoids the overhead of having to switch between user space and kernel space, and the associated cost of numerous context switches. Note that in most cases, GPU-kernels apply to user space applications and do not require direct access to system resources requiring kernel space access. As is known by persons skilled in the art, multiple user-level threads can be implemented within a single operating system level thread.

In some embodiments of the present invention, workitem threads can be executed in groups within a workgroup. For example, in environments where a vector unit such as a SSE unit (e.g., SSE unit 145 in system 100) that can simultaneously accommodate more than one floating-point or double computation is available, the compiler can combine a number of workitems to execute in parallel such that the full processing capacity of the SSE unit is utilized.

In step 319, the memory accessible to the CPU cores is mapped to accommodate the memory hierarchy available to a GPU. The processing of step 203 can be part of the functionality provided by CPU memory mapper 203. Mapping of the GPU memory hierarchy to the CPU cores so that the GPU-kernels can execute on the CPU cores can include several aspects. The mapping from the GPU memory hierarchy to the CPU memory can be required because the GPU-kernel code can include references to locations in the GPU memory hierarchy. The CPU cores typically have only a single address space for its memory (e.g., system memory 103), whereas GPU cores can have several separately addressable memories. The GPU global memory, compute device local memory, and processing element private memory, all can be mapped to CPU memory.

The GPU global memory, such as, GPU memory 107, can be mapped directly to system memory, such as, memory 103. Mapping of the GPU local memory and private memory require a more nuanced approach. Mapping, as used in relation to memory, can involve setting up an automatic address translation mechanism by which a memory address included in a GPU-kernel executing on a CPU core is redirected to system memory 103 instead of a location in a memory hierarchy associated with a GPU.

GPU local memory, such as, GPU local memory 114 and 115, is shared between the processing elements of a compute unit. Therefore, one GPU local memory is shared between all workitems of a workgroup. When the workgroups are mapped to a CPU, because a workgroup is mapped to a single CPU core, the corresponding GPU local memory can be brought into this CPU core. In many cases, the actual usage of local memory in a GPU can be such that it may fit entirely in the cache memory of a CPU core.

GPU local memory, such as GPU local memories 114 and 115, are shared by workitems in a workgroup. Embodiments of the present invention may restrict each CPU core to execute only a single workgroup at a time. When a CPU executes only a single workgroup at a time, at any instance, only a single allocation that corresponds to GPU local memory is utilized by a CPU core. Accordingly, a single local memory per CPU core can be allocated, and the allocated local memory can be reused for successive workgroups that execute on that CPU core. A local memory can be allocated for each compute device in a contiguous memory area of a system memory. Preferably, a cache memory in a CPU core can be of sufficient magnitude to accommodate an instance of the allocation of local memory in system memory, corresponding to that CPU core. A person of skill in the art will understand that the local memory area allocated in the memory and/or cache may require being flushed before being reused for each successive workgroup. In some embodiments, the local memory area allocated in the memory and/or cache may be reused by overwriting the previous contents.

GPU private memory, such as GPU private memories 131, 132, 133, and 134, are private to each processing element. Each private memory in the GPU environment is used by a single workitem at a time. Therefore, similarly to local memories, private memories can be allocated in system memory and reused for successive workitems. For example, a single allocation for a private memory in the system memory 103 can be reused by successively executing workitems of a single workgroup, and within successive workgroups executed by the same CPU core. GPU private memory, and therefore the allocation in system memory 103 corresponding to the GPU private memory, is typically used for holding stack variables that are internal to the kernel and are local to each workitem.

Figure 4:
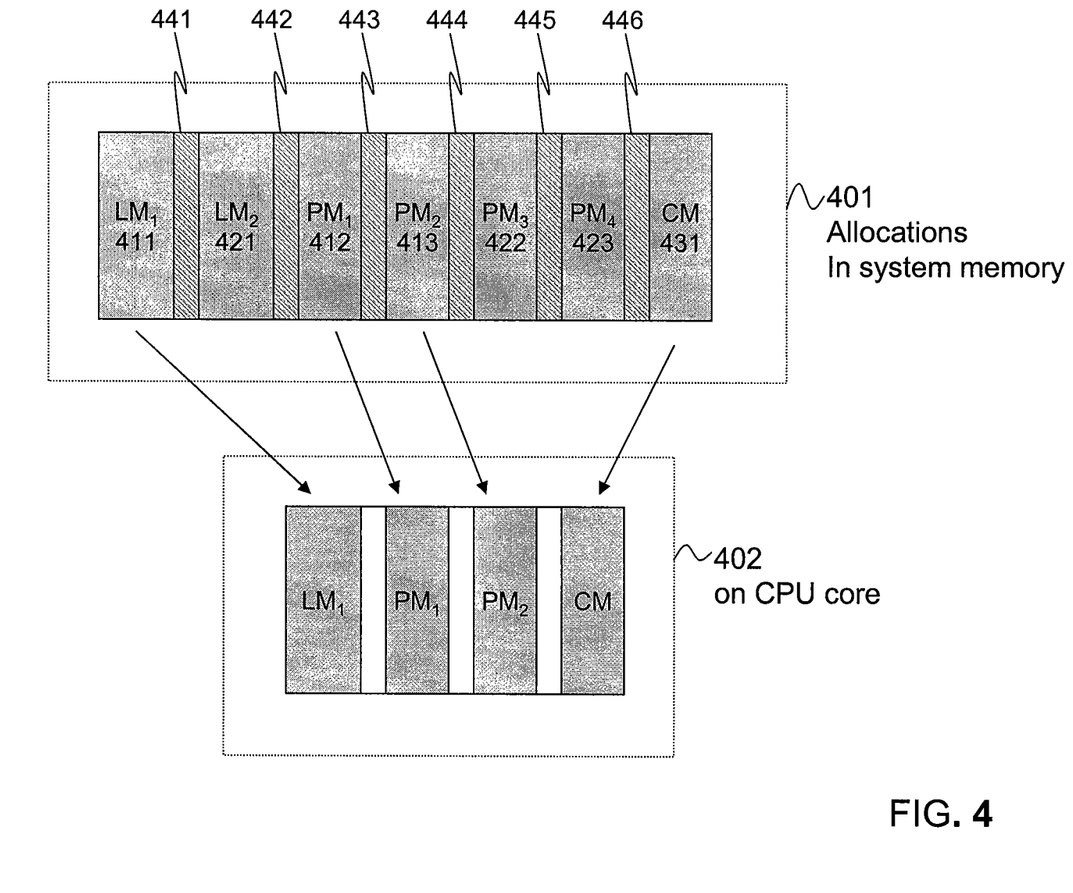
FIG. 4 is an illustration of an example memory layout in accordance with the present invention.

Constant memory contains data that have values which are constant throughout the execution of the code. For GPU-kernels executing on a GPU, constant memory can be in graphics memory 107 and/or GPU global cache memory 110. Constant memory, in general, can be read only and is not dependent on the workgroup. In embodiments of the present invention, the constant memory is mapped to an area in system memory that can be accessible to all CPU cores, because any workgroup or workitem executing on any CPU core may require access to constant memory. Also, it is preferable that the constant memory allocation from the main memory is replicated in the cache memory of each CPU core. An example layout of mapping a GPU memory hierarchy to CPU is shown in FIG. 4.

In step 321, the GPU-kernel can be scheduled to execute on one or more selected CPU cores, such as, cores 141 and/or 142. Scheduling the GPU-kernel for execution can include configuring the execution environment, such as the OpenCL runtime system, to implement the mapping of workgroups and workitems on selected CPU cores.

In one embodiment of the present invention, where the OpenCL framework is being used to compile and execute code on heterogeneous computing system 100, step 321 can involve the queuing of one or more commands to a command queue. For example, using the OpenCL framework in heterogeneous computing system 100, a GPU-kernel can be scheduled to be executed on one or more cores 141 and multi-core CPU 101. Typically, in running an application on heterogeneous computing system 100 using the OpenCL framework the control portion runs on the host that initiates the execution of selected code on devices of system 100 such as GPU 102 or cores 141 or 142. A CPU core, such as one of the cores 141 or 142, can function as the host and distribute the GPU-kernels to devices of system 100 to be executed. For example, commands to map CPU memory, and commands to execute the GPU-kernel can be scheduled in a command queue created in the context created for the multi-core CPU 101. The OpenCL runtime environment executes each of the commands written to the respective command queue in the specified device in system 100.

In scheduling the GPU-kernel for execution on multi-core CPU 101, instructions to enforce the mappings and configurations determined in steps 313-325 can be inserted in the code to be executed on the multi-core CPU 101. For example, the workitems within a workgroup may require a synchronization point to be inserted either automatically or manually by a programmer.

In implementing workitem synchronization within a workgroup on multi-core CPU 101, embodiments of the present invention can enable workitems to execute up to a synchronization point. For example, one by one each workitem executes up to a synchronization point (e.g., a barrier( ) function) in a serial manner and halts at the synchronization point before the next workitem is executed. When all workitems in the workgroup having the synchronization point have reached there, each workitem serially executes from the synchronization point to the end of the workitem. Functions such as setjmp( ) to save the workitem state, and longjmp( ) to restore the state of that workitem, can be inserted into the code. In embodiments of the present invention, such additional code is not inserted in the source code of the GPU-kernels. Rather, such additional code is inserted in the entry, exit, and/or barrier routines of the GPU-kernels (and not within the GPU-kernel code). By not altering the source code of the GPU-kernels themselves, embodiments of the present invention facilitates debugging efforts.

In step 323, it is determined whether there is additional code to be executed, and if so, process 300 is returned to step 307. If no more code is to be executed, process 300 terminates in step 325.

An Example Memory Mapping to CPU

FIG. 4 illustrates an example memory layout in system memory and in cache memory of one CPU core. 401 illustrate a layout, for example, in system memory 103, of memory allocations corresponding to a GPU-kernel that was originally written to execute on a GPU such as GPU 102. 402 illustrate a corresponding memory layout in the cache of a single CPU core, for example in cache 109 in CPU 101.

For example, local memory 411 and 421 can correspond to local memory 114 and 115, respectively, of GPU 102. Private memories 412, 413, 422, and 423, can correspond to private memories 131, 132, 133, and 134, respectively, of GPU 102. Constant memory can correspond to constant memory 431 (i.e., memory area where constant parameters are stored). As shown in 402, the cache of a CPU core can have one local memory block, a series of private memory blocks corresponding to one block for each workitem in the workgroup, and a constant memory area. In some embodiments, it can be particularly advantageous to have the local memory, private memory, and constant memory required for processing by a CPU core to all is available in the cache of the CPU core, such that delays associated with access to system memory 103 can be reduced.

As shown in 401, a contiguous region of system memory can be allocated to each local memory 411 and 421, such that it emulates local memories 114 and 115, respectively of GPU 102. The local memory addresses accessed by the GPU-kernel code can be translated to offsets within this allocated region. The total size of the local memory allocated in system memory can be M*(local memory size per workgroup), where M is the number of CPU cores. The total size of the private memory can be M*N*(size of private memory per workitem), where M is the number of cores and N is the number of workitems per workgroup.

For added debugging capability, some embodiments of the present invention can include guard pages between separate memory allocations in system memory. For example, guard pages 441, 442, 443, 444, 445, and 446 can be inserted between allocations for different OS threads, as well as between different memory allocations for the same thread. In an example implementation, a register can be set each time an instruction attempts to access a guard page area of the memory. The fast detection of memory access errors can be particularly useful in applications where numerous parallel threads are execute in a substantially parallel manner.

An Example Scheduling of Workitems on CPU

Figure 5:
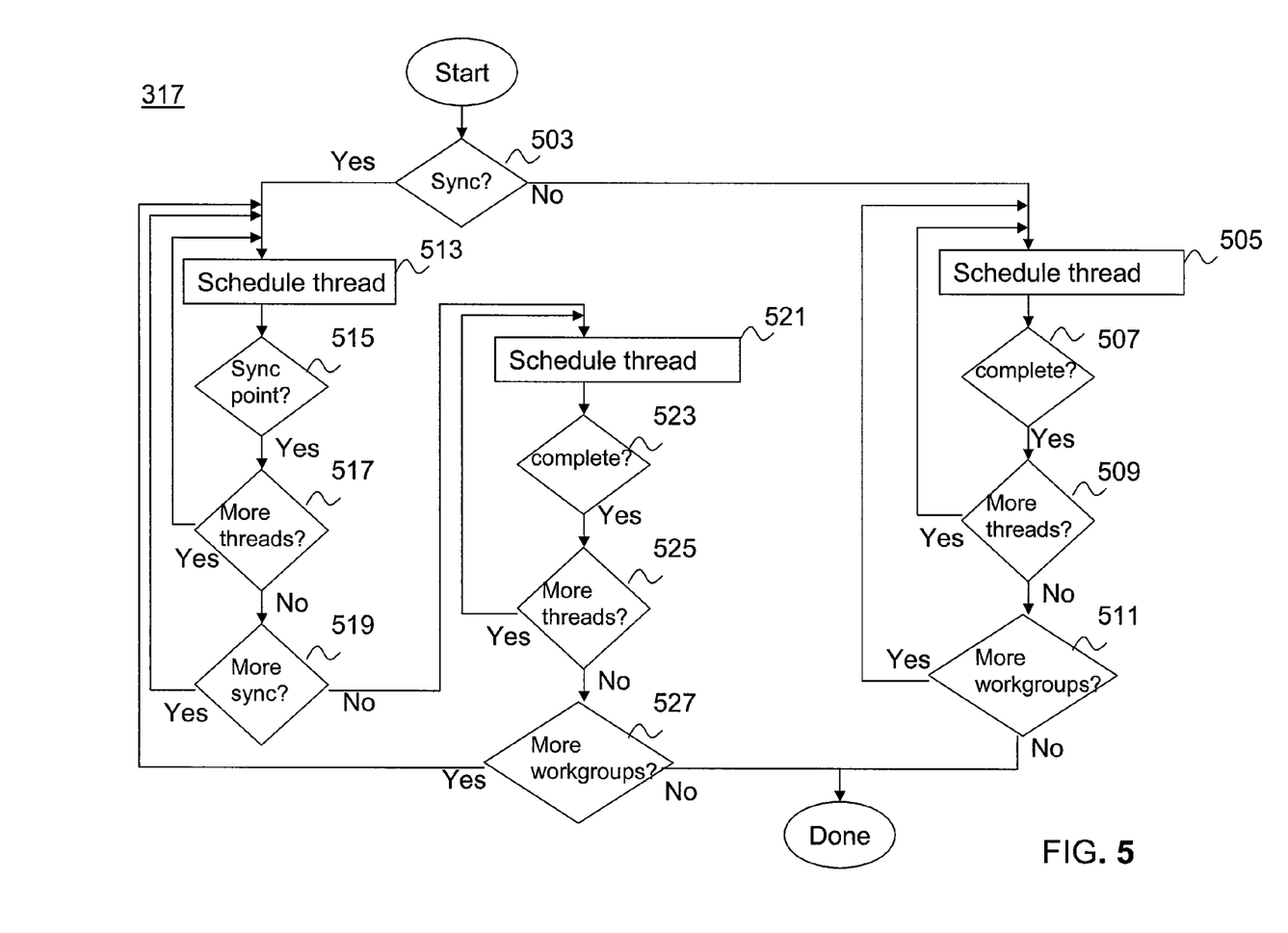
FIG. 5 is a process for scheduling workitems on a heterogeneous computing system in accordance with the present invention.

FIG. 5 shows processing steps 501-523 implementing step 317, according to an embodiment of the present invention. In step 501, the workgroup threads are scheduled. As described above, embodiments of the present invention creates a single operating system thread on each CPU core within which multiple user level threads are scheduled. For example, if twenty instances 1 . . . 20 of the GPU-kernel is to be scheduled, GPU-kernel threads 1 . . . 10 (as workitems 1 . . . 10) can be scheduled for core 141, and GPU-kernel threads 11 . . . 20 (as workitems 11 . . . 20) can be scheduled for core 142. Workitems 1 . . . 10 and 11 . . . 20 can be collected to workgroup 1 and workgroup 2, respectively. As noted above, each workgroup is implemented as an OS thread, and therefore one OS thread can be created on each of cores 141 and 142, to implement workgroups 1 and 2, respectively.

In step 503, it is determined whether the GPU-kernel requires synchronization with other parallel executing GPU-kernels. For example, the OpenCL code may include one or calls to a barrier( ) function. If such a call for synchronization exists, then it is determined that the GPU-kernel requires synchronization; otherwise the GPU-kernel may not require synchronization.

If it is determined that the GPU-kernel does not require synchronization, then the GPU-kernel is scheduled to execute from beginning to end according to the number instances required. For example, within each of the OS threads created in step 501, a predetermined number of GPU-kernels, or workitems, are scheduled to execute as user-level threads. Because, no synchronization is required among the workitems, each workitem is scheduled to execute from beginning to end.

When the execution of a workitem user thread is completed, in step 505, the OpenCL execution framework can be notified, for example, by the use of a callback function. When it is notified that a workitem has completed execution, in step 507, the next workitem in the workgroup can be scheduled for execution as a user level thread in step 509. The OpenCL execution framework can also periodically query one or more status parameters to determine if a workitem has completed execution. When no more workitems remain to be scheduled within the workgroup, the workgroup has completed execution.

It should be noted that, in some embodiments, more than one workgroup can be scheduled on each CPU core, to be executed serially one after another. If in step 509, it is determined that all workitems of the executing workgroup has completed execution, then, in step 511 it is determined if there are other workgroups to be executed on the current core. If there are more workgroups to be scheduled on the current CPU core, then the next workgroup is scheduled for execution. Scheduling another workgroup may include re-initializing the memory allocations for the currently executing OS thread on the current CPU core. Note, that in embodiments of the present invention, the memory allocations can be done once when the OS thread is created, and generally does not require reallocation for each workgroup assigned to that OS thread.

If, in step 503, it is determined that synchronization is required, a GPU-kernel is scheduled to execute from beginning to the next synchronization point (e.g., barrier( ) call), according to the number instances required. For example, in step 513, the user-level thread of a workitem is scheduled to execute from beginning to the next occurring call to barrier( ). When the call to barrier( ) is encountered, the state of the executing thread can be saved. In one embodiment, a function call, such as setjmp( ), can be used to save the state of the user-level thread. The state of the thread that is saved can include contents of registers, such as, stack pointer, frame pointer, and program counter. The state of each workitem user-level thread can be saved in an area of the system memory such as system memory 103, or in persistent memory, such as persistent memory 104.

When, in step 515, the executing workitem thread reaches the synchronization point, then in step 517, it is determined if more workitems are to be scheduled within the current workgroup. When the execution of a workitem user-level thread reaches the synchronization point, in step 515, the OpenCL execution framework can be notified, for example, using a callback function. When it is notified that a workitem has reached the synchronization point, in step 515, the next workitem in the workgroup can be scheduled for execution as a user-level thread in step 517. The OpenCL execution framework can also periodically query one or more status parameters to determine if a workitem has reached the synchronization point. When no more workitems remain to be scheduled within the workgroup, the workgroup has completed executing each workitem to the synchronization point.

If, in step 519, the workitems are determined to have more synchronization points before reaching the end of the thread execution, steps 513-525 are repeated for each workitem to execute from the current synchronization point to the next synchronization point.

If, in step 519, it is determined that the workitems in the workgroup have no more synchronization points, then in step 521, one or the workitems that has reached the synchronization point is scheduled to execute from that point to the end. Scheduling a workitem thread to execute from the synchronization point to the end can involve restoring the state of the thread. In one embodiment, a function call, such as longjmp( ), can be used to restore the state of the thread that was previously saved using setjmp( ). It is noted that setjmp( ) and longjmp( ) are function names that are conventionally identified with saving and restoring the state, respectively, of a process or thread.

In step 523, it is determined if the executing workitem thread has completed execution. As described in relation to step 507, the determination of whether the workitem thread has completed execution can be based on a callback function or periodic query. If it is determined that the workitem has completed execution, then in step 523, it is determined whether more workitem threads are to be executed from the last encountered synchronization point to the end. If so, the next workitem is scheduled and steps 521-525 repeated for each workitem to be executed.

When all of the workitem threads of a workgroup have completed execution, then, in step 527, it is determined if other workgroups are to be scheduled on the currently selected CPU core. If other workgroups are to be scheduled, then steps 513-527 are repeated for each of the other workgroups.

Figure 6:
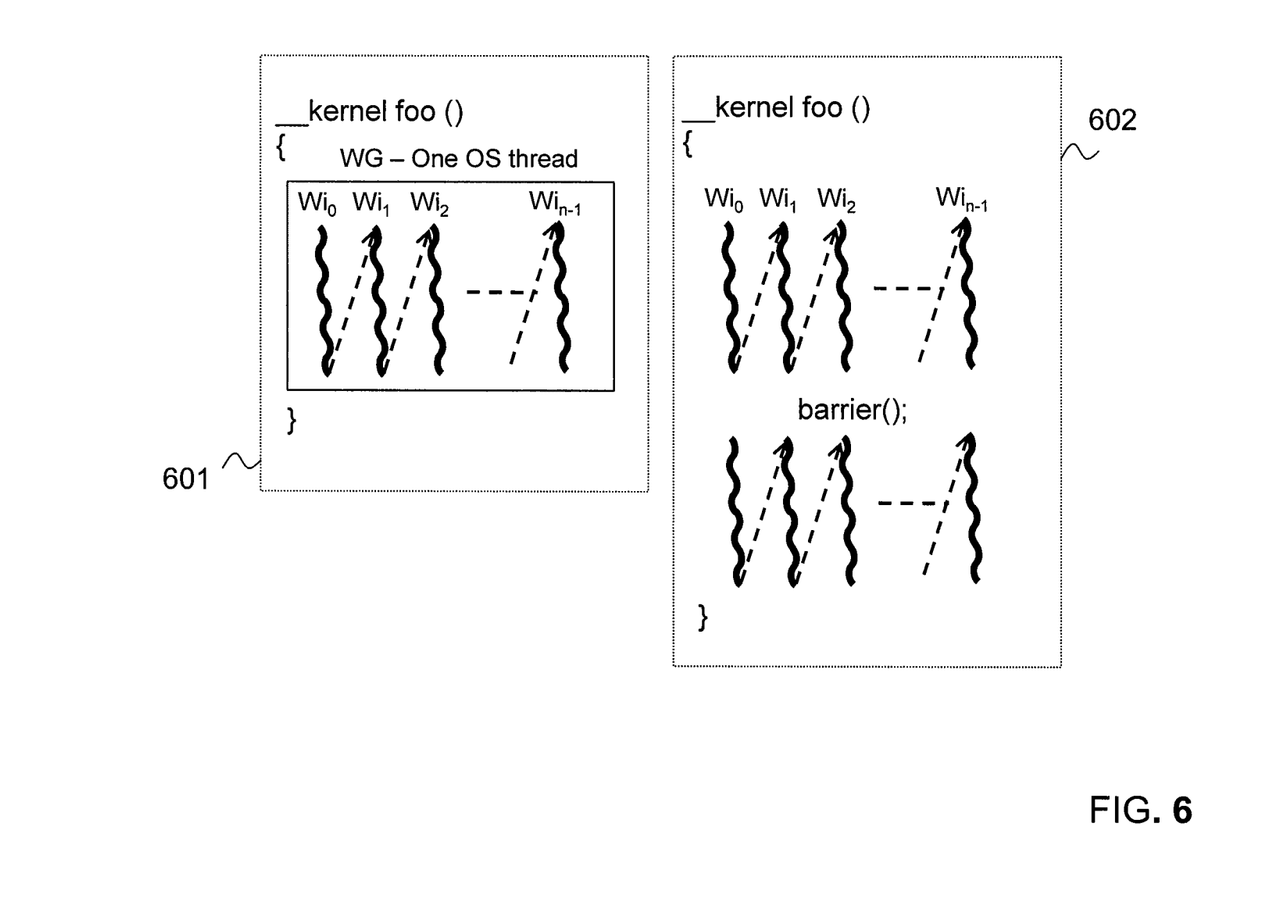
FIG. 6 is an example illustration of thread scheduling in accordance with the present invention.

FIG. 6 graphically illustrates workitem thread execution. In 601, workitem threads $Wi_0 \ldots Wi_{n-1}$ are executed one after another until all workitems of the workgroup have been executed from beginning to end. 601 illustrates the case where no synchronization is required. In 602, workitem threads $Wi_0 \ldots Wi_{n-1}$ are executed one after another until all of the workitems of the workgroup have been executed from beginning to the first synchronization point, indicated here with a call to barrier( ). After all workitems of the workgroup have executed from beginning to barrier( ), then each one of those workitems are executed, one after another, from the synchronization point to the end.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   grouping a first plurality of parallel threads into a first workgroup of a set of workgroups and grouping a second plurality of parallel threads into a second workgroup of the set of workgroups, wherein the first workgroup is assigned to a first processor core of a processor and the second workgroup is assigned to a second processor core of the processor;
   associating the first workgroup with a first operating system thread configured to execute on the first processor core of the processor;
   mapping a system memory associated with the first processor core to accommodate a memory hierarchy associated with a second processor to enable the scheduling of a parallel thread configured for the second processor to be executed on the first processor core, wherein the processor and the second processor are different processor types and the memory hierarchy associated with the second processor is mapped to the system memory of the first processor core, wherein the memory hierarchy includes a private memory and a local memory, wherein the mapping comprises allocating a plurality of first areas in the system memory coupled to the first processor core of the processor, each of said first areas corresponding to the private memory accessible by one parallel thread from the first workgroup, and allocating a plurality of second areas in the system memory coupled to the first processor core of the processor, each of said second areas corresponding to the local memory associated with all parallel threads from the first workgroup; and
   scheduling the first plurality of parallel threads within the first operating system thread, wherein the scheduling comprises configuring the first plurality of parallel threads to execute up to a synchronization point and configuring each of the first plurality of parallel threads to restart execution from the synchronization point after all of the first plurality of parallel threads reach the synchronization point.

2. The method of claim 1, wherein the scheduling comprises:
   grouping the parallel threads from the first workgroup to subsets of threads;
   configuring a first subset for execution; and
   configuring a second subset to execute after the first subset has completed execution.

3. The method of claim 1, further comprising:
   associating the second workgroup with a second operating system thread on the second processor core; and
   scheduling the second plurality of parallel threads from the second workgroup of the set of workgroups within the associated second operating system thread,
   wherein the first and second workgroups are configured to execute substantially simultaneously.

4. The method of claim 1, wherein the scheduling further comprises:
   saving a state for each of the first plurality of parallel threads from the first workgroup upon reaching the synchronization point; and
   restoring the state for each of the first plurality of parallel threads from the first workgroup prior to said restarting execution.

5. The method of claim 4, wherein the saving a state comprises executing code in a library routine called from respective ones of the first plurality of parallel threads to save the state.

6. The method of claim 1, wherein the scheduling further comprises:
   inserting a synchronization call in a code for the first plurality of parallel threads from the first workgroup.

7. The method of claim 1, wherein the first processor core is a control processing unit (CPU) core.

8. The method of claim 1, wherein the first plurality of parallel threads is a graphics processing unit (GPU) kernel.

9. The method of claim 1, wherein the mapping further comprises:
   allocating guard pages between each pair of first areas from the plurality of first areas; and
   allocating guard pages between each pair of second areas from the plurality of second areas.

10. The method of claim 1, wherein the mapping further comprises:
    forming a cache area in a cache memory coupled to the first processor core, wherein the cache area comprises contents of at least one of said first areas and a second area.

11. The method of claim 1, wherein the configuring parallel threads comprises scheduling of the parallel threads by a thread library.

12. The method of claim 1, wherein the associating the first workgroup comprises setting a processor affinity of the operating system thread for the processor core.

13. The method of claim 1, wherein the scheduling comprises scheduling the respective data parallel threads to execute in user space without switching to kernel space.

14. The method of claim 1, wherein a quantity of workgroups in the set of workgroups is the same as a quantity of processor cores of the processor.

15. A method comprising:
loading an application comprising a graphics processing unit (GPU) GPU-kernel to a host processor, wherein the GPU-kernel has been previously configured for execution on a GPU, and wherein the GPU-kernel is configured to instantiate a plurality of parallel threads on a GPU;
grouping a first plurality of parallel threads into a first workgroup of a set of workgroups and grouping a second plurality of parallel threads into a second workgroup of the set of workgroups, wherein the first workgroup is assigned to a first processor core of a host processor and the second workgroup is assigned to a second processor core of the host processor;
associating the first workgroup with a first operating system thread of the first processor core coupled to the host processor, wherein said first operating system thread is configured to execute only on one of said processor cores of the host processor;
mapping a system memory associated with the first processor core of the host processor to accommodate a memory hierarchy associated with the GPU to enable the scheduling of a parallel thread configured for the GPU to be executed on the first processor core of the host processor, wherein the host processor and GPU are different processor types and the memory hierarchy associated with the GPU is mapped to the system memory of the first processor core of the host processor, wherein the memory hierarchy includes a private memory and a local memory, wherein the mapping comprises allocating a plurality of first areas in the system memory coupled to the first core of the host processor, each of said first areas corresponding to the private memory accessible by one parallel thread from the first workgroup, and allocating a plurality of second areas in the system memory coupled to the first core of the host processor, each of said second areas corresponding to the local memory associated with all parallel threads from the first workgroup; and
scheduling the first plurality of parallel threads within the first operating system thread, wherein the scheduling comprises configuring the threads from the first workgroup to execute up to a synchronization point and configuring each of the first plurality of parallel threads to restart execution from the synchronization point after all of the first plurality of parallel threads reach the synchronization point.

16. The method of claim 15, wherein a quantity of workgroups in the set of workgroups is the same as a quantity of processor cores of the processor.

17. A system comprising:
at least one processor including a processor core;
at least one memory coupled to the processor core;
a graphics processing unit (GPU) kernel scheduler coupled to the at least one memory and to the at least one processor, configured for:
grouping a first plurality of parallel threads into a first workgroup of a set of workgroups and grouping a second plurality of parallel threads into a second workgroup of the set of workgroups, wherein the first workgroup is assigned to a first processor core of a processor and the second workgroup is assigned to a second processor core of the processor;
associating the first workgroup with an operating system thread configured to execute on the first processor core of the processor;
mapping a system memory associated with the first processor core to accommodate a memory hierarchy associated with a GPU to enable the scheduling of a parallel thread configured for the GPU to be executed on the first processor core, wherein the processor and the GPU are different processor types and the memory hierarchy associated with the GPU is mapped to the system memory of the first processor core, wherein the memory hierarchy includes a private memory and a local memory, wherein the mapping comprises allocating a plurality of first areas in the system memory coupled to the first processor core of the processor, each of said first areas corresponding to the private memory accessible by one parallel thread from the first workgroup, and allocating a plurality of second areas in the system memory coupled to the first processor core of the processor, each of said second areas corresponding to the local memory associated with all parallel threads from the first workgroup; and
scheduling respective parallel threads from the first workgroup within the associated operating system thread, wherein the scheduling comprises configuring the respective parallel threads from the workgroup to execute up to a synchronization point and configuring each of the first plurality of parallel threads to restart execution from the synchronization point after all of the first plurality of parallel threads reach the synchronization point.

18. The system of claim 17, wherein the graphics processing unit kernel scheduler is further configured for:
grouping threads from the first workgroup to a subset of threads;
configuring a first subset for execution; and
configuring a second subset to execute after the first subset has completed execution.

19. The system of claim 17, wherein the processor is a central processing unit (CPU).

20. The system of claim 17, wherein a quantity of workgroups in the set of workgroups is the same as a quantity of processor cores of the processor.

21. A tangible computer program product comprising a non-transitory computer readable storage medium having computer program logic recorded thereon for causing at least one processor to:
group a plurality of parallel threads into a first workgroup of a set of workgroups and group a second plurality of parallel threads into a second workgroup of the set of workgroups, wherein the first workgroup is assigned to a first processor core of a processor and the second workgroup is assigned to a second processor core of the processor;
associate the first workgroup with an operating system thread configured to execute on the first processor core;
map a system memory associated with the first processor core to accommodate a memory hierarchy associated with a second processor to enable the scheduling of a parallel thread configured for the second processor to be executed on the first processor core, wherein the processor and the second processor are different processor types and the memory hierarchy associated with the second processor is mapped to the system memory of the first processor core, wherein the memory hierarchy includes a private memory and a local memory, wherein the at least one processor is further configured to allocate a plurality of first areas in the system memory coupled to the first processor core of the processor, each of said first areas corresponding to the private memory accessible by one parallel thread from the first workgroup, and allocate a plurality of second areas in the system memory coupled to the first processor core of the processor, each of said second areas corresponding to the local memory associated with all parallel threads from the first workgroup; and schedule respective parallel threads from the first workgroup within the associated operating system thread, wherein the scheduling comprises configuring the respective parallel threads from the first workgroup to execute up to a synchronization point and configuring each of the first plurality of parallel threads to restart execution from the synchronization point after all of the first plurality of parallel threads reach the synchronization point.

22. The tangible computer program product of claim 21, wherein the non-transitory computer readable storage medium having computer program logic recorded thereon for further causing at least one processor to:

group parallel threads from the first workgroup to a subset of threads;

configure a first subset for execution; and configure a second subset to execute after the first subset has completed execution.

23. The tangible computer program product of claim 21, wherein a quantity of workgroups in the set of workgroups is the same as a quantity of processor cores of the processor.

24. A method for executing a plurality of parallel threads of a processing logic on a processor core of a processor, the method comprising:

grouping the plurality of parallel threads into a workgroup;

associating the workgroup with an operating system thread configured to execute on the processor core;

scheduling respective parallel threads from the workgroup within the associated operating system thread;

mapping a system memory associated with the processor core to accommodate a memory hierarchy associated with a second processor to enable the scheduling of a parallel thread configured for the second processor to be executed on the processor core, wherein the processor and the second processor are different processor types and the memory hierarchy associated with the second processor is mapped to the system memory of the first processor core, wherein the memory hierarchy includes a private memory and a local memory, wherein the mapping comprises:

allocating a plurality of first areas in the system memory coupled to the processor core, wherein each of said first areas correspond to the private memory accessible by one parallel thread from the workgroup;

allocating a plurality of second areas in the system memory coupled to the processor core, wherein each said second area corresponds to the local memory associated with all parallel threads from the workgroup;

allocating guard pages between each pair of first areas from the plurality of first areas; and allocating guard pages between each pair of second areas from the plurality of second areas.

25. A method comprising:

grouping a first plurality of parallel threads into a first workgroup of a set of workgroups and grouping a second plurality of parallel threads into a second workgroup of the set of workgroups, wherein the first workgroup is assigned to a first processor core of a processor and the second workgroup is assigned to a second processor core of the processor;

associating the first workgroup with a first operating system thread configured to execute on the first processor core;

mapping a system memory associated with the first processor core to accommodate a memory hierarchy associated with a second processor to enable the scheduling of a parallel thread configured for the second processor to be executed on the first processor core, wherein the processor and the second processor are different processor types and the memory hierarchy associated with the second processor is mapped to the system memory of the first processor core, wherein the memory hierarchy includes a private memory and a local memory;

allocating a first regions of the system memory coupled to the first processor core, wherein the first regions correspond to the private memory accessible by one parallel thread from the workgroup and allocating a second regions of the system memory coupled to the first processor core, wherein the second regions correspond to the local memory associated with all parallel threads from the workgroup, wherein guard pages are inserted between different regions; and scheduling the first plurality of parallel threads within the first operating system thread, wherein the scheduling comprises configuring the first plurality of parallel threads to execute up to a synchronization point and configuring each of the first plurality of parallel threads to restart execution from the synchronization point after all of the first plurality of parallel threads reach the synchronization point.

* * * * *